Figure 1:
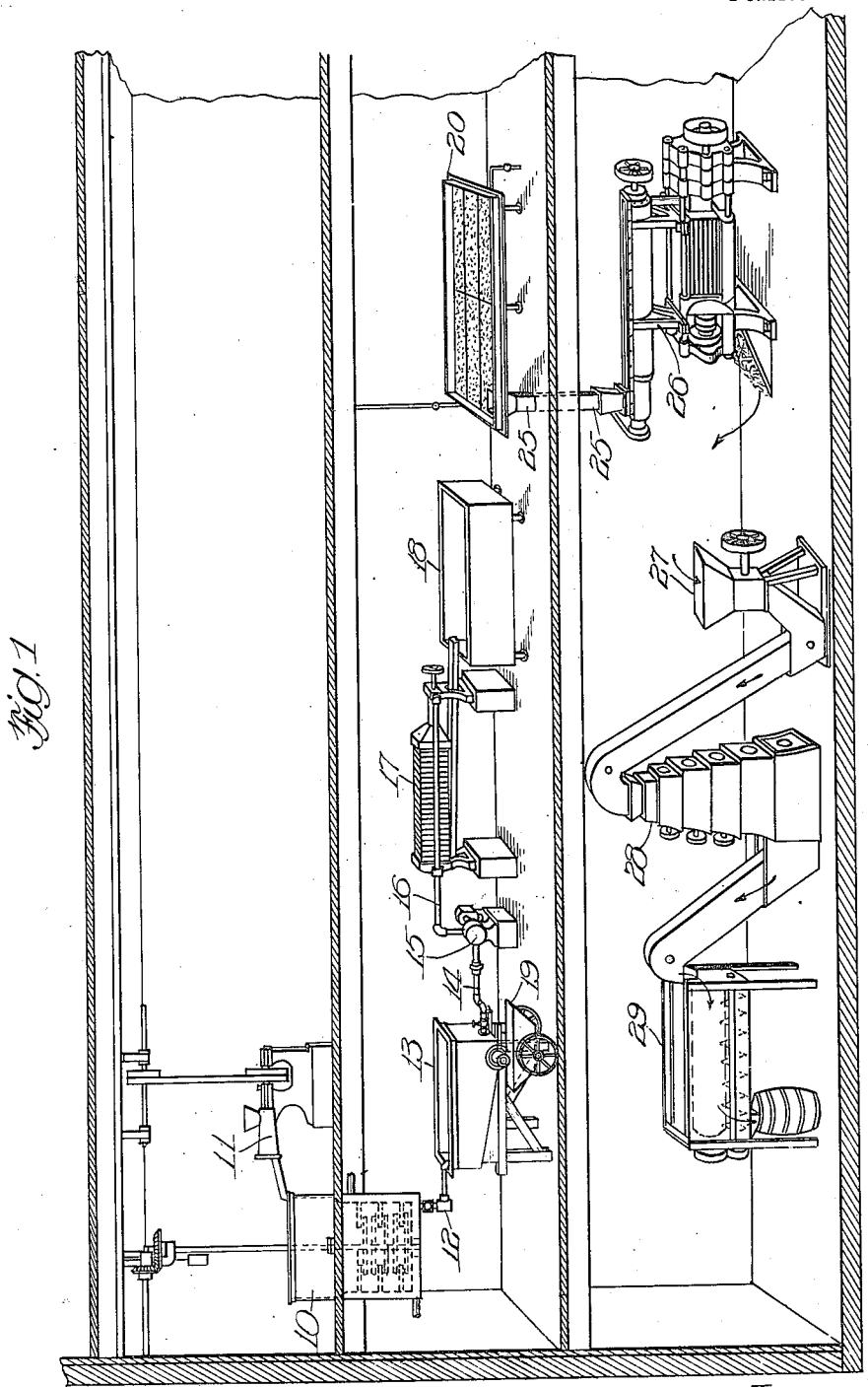

W. B. ALLBRIGHT.
LARD CRACKLINGS PROCESS AND PRODUCT.
APPLICATION FILED DEC. 6, 1917.

1,317,675.

Patented Oct. 7, 1919.
2 SHEETS—SHEET 1.

Inventor
William B. Allbright

By Munday Clark & Cooper Attys

W. B. ALLBRIGHT.
LARD CRACKLINGS PROCESS AND PRODUCT.
APPLICATION FILED DEC. 6, 1917.
1,317,675.
Patented Oct. 7, 1919
2 SHEETS—SHEET 2.
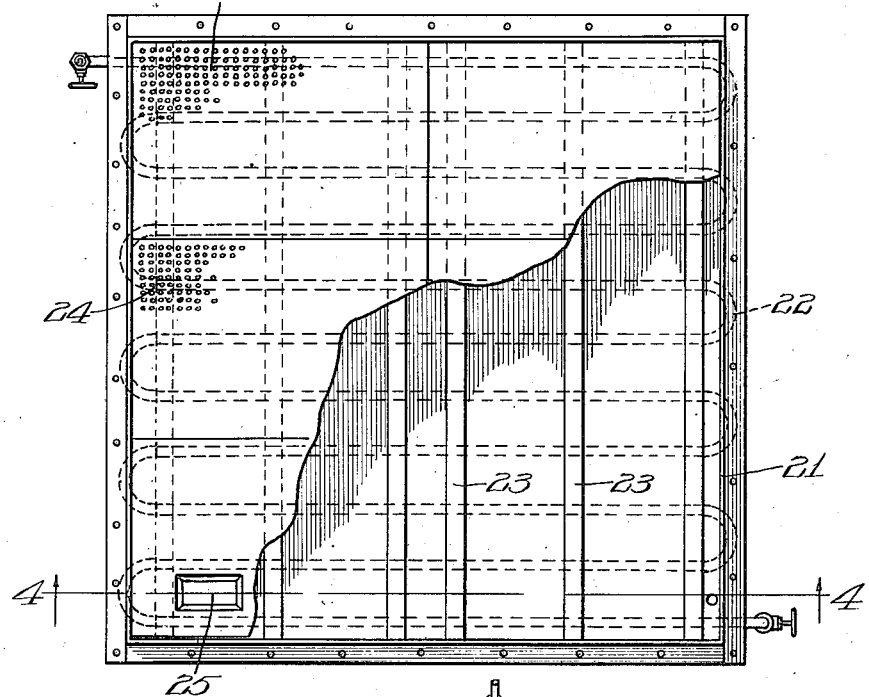
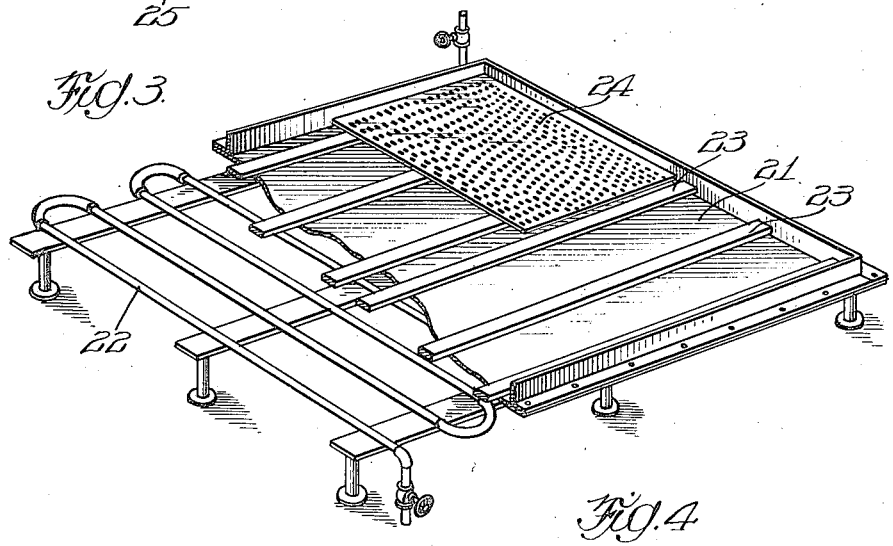
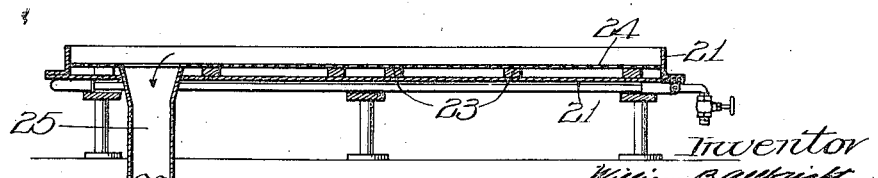

UNITED STATES PATENT OFFICE.

WILLIAM B. ALLBRIGHT, OF CHICAGO, ILLINOIS.

LARD-CRACKLINGS PROCESS AND PRODUCT.

1,317,675. Specification of Letters Patent. Patented Oct. 7, 1919.

Application filed December 6, 1917. Serial No. 205,739.

*To all whom it may concern:*

Be it known that I, WILLIAM B. ALLBRIGHT, a citizen of the United States, residing in Chicago, in the county of Cook and State of Illinois, have invented a new and useful Improvement in Lard - Cracklings Processes and Products, of which the following is a specification.

The invention relates to the treatment of lard-cracklings for the more effective recovery of their contained lard and for the production of a valuable food-product from the residuum. The process and the apparatus for practising it, and the food-product obtained, are hereinafter set forth and claimed.

In the drawings, which show a suitable form and arrangement of apparatus, without limiting the claimed invention to such illustrative instance, Figure 1 is an elevational view of the combined series of elements of apparatus preferably employed for completely practising the process and producing the food-product; Fig. 2 is a plan view of the special cooling, draining and rewarming table for the cracklings; Fig. 3 is a perspective view of the same table; and Fig. 4 a section on the line 4—4 of Fig. 2. Like reference numerals indicate like parts in all of the figures.

Lard-cracklings are, as it is well known, a residuum or by-product of the making of kettle-rendered lard, and they contain a considerable amount of residual lard which is difficult to recover and which therefore occasions loss that materially increases the cost of producing kettle-rendered lard. And after the cracklings have been subjected to the ordinary methods by which it is sought to recover some of their contained lard, the residuum is of such character as to be of little value or use. The present invention both effects a greatly increased proportionate recovery of the contained lard, and produces a valuable and highly nutritious food-product from the residuum of the cracklings.

In the illustrative apparatus in Fig. 1, the steam-jacketed and mechanically-stirred kettle for rendering the lard is shown at 10, such kettle being fed with the prepared fats from the hasher-machine, and the lard and cracklings being discharged at intervals through the outlet 12 leading into the receiver and strainer tank 13. From this tank the lard is drawn, through the pipe 14, by the pump 15 and forced through the pipe 16 into the filter-press 17, and thence goes into the vat 18. The cracklings accumulated in the tank 13 are at intervals taken off into the barrow 19 and directly conveyed to and spread out upon the draining and cooling table 20. This table consists in a large sheet-metal pan 21 supported on steam pipes 22 and itself supporting, on wood slats 23, a covering of perforated plates 24 on which the cracklings are spread out in a relatively thin layer. The limited amount of lard that drains off through the perforated plates 24 is caught in the pan 21 and may be removed by a drain or in any convenient manner. The cracklings are allowed to cool and are kept spread out upon this table, at a moderate temperature of, for instance, about 100°, for a number of hours, until they become relatively dry and brittle, and then they are somewhat rewarmed, to, for instance, about 120°, and at once raked into the chute 25 leading from the top-plates of the drain-table down into the expeller machine, in which they are further warmed and subjected to progressive pressure, such machine being shown at 26 as the well-known Anderson expeller. Received in this condition into this expeller machine, the cracklings give up all but a very small percentage of their contained lard; and the crackling residuum comes from the expeller machine in relatively dry and thin strips resembling planing-mill shavings, and quickly becoming very brittle. This residuum is passed into the grinder 27 and thence into the rolls 28 that pulverize it to the fineness of flour, and thence into the bolting machine 29, from which it is discharged into the shipping-barrels. Such flour product is of highly nutritious character, containing, for instance, some 6 per cent. fat and 87 per cent. protein, and is of great utility as a highly concentrated and well flavored food-product, usable as a considerable ingredient in the making of bread, and for mixing with sausage meat, and as an ingredient of various other prepared foods.

The invention may be embodied and practised in various forms and ways within the following claims:

1. In a process for treating lard-cracklings from kettle-rendered lard, the successive steps of spreading out and cooling and draining the cracklings, to effect their inspissation and reduce them to brittleness, and then rewarming them, to bring their lard content to liquescence, and then subjecting them to progressive pressure to express the lard.

2. In a process for treating lard-cracklings from kettle-rendered lard, the successive steps of spreading out and cooling and draining the cracklings, to effect their inspissation and reduce them to brittleness, and then rewarming them, to bring their lard content to liquescence, and then subjecting them to progressive pressure to express the lard, and then grinding and flouring the residuum.

3. As a food-product, a lard-cracklings flour, of bolted fineness.

WILLIAM B. ALLBRIGHT.

Witnesses:
 HENRY LOVE CLARKE,
 THOMAS J. O'BRIEN.